No. 778,496. PATENTED DEC. 27, 1904.
A. H. MARKS.
PNEUMATIC TIRE OR OTHER FLEXIBLE TUBULAR ARTICLE.
APPLICATION FILED MAY 3, 1904.

No. 778,496. Patented December 27, 1904.

UNITED STATES PATENT OFFICE.

ARTHUR H. MARKS, OF AKRON, OHIO.

PNEUMATIC TIRE OR OTHER FLEXIBLE TUBULAR ARTICLE.

SPECIFICATION forming part of Letters Patent No. 778,496, dated December 27, 1904.

Application filed May 3, 1904. Serial No. 206,147.

*To all whom it may concern:*

Be it known that I, ARTHUR H. MARKS, a citizen of the United States, residing at Akron, in the county of Summit and State of Ohio, have invented new and useful Improvements in Pneumatic Tires or other Tubular Flexible Articles, of which the following is a specification.

This invention relates to improvements in pneumatic tires, tire-covers, and other tubular flexible articles designed to withstand internal pressure; and the object is to provide a strong and durable structure.

With the above object in view the invention consists in the novel features of construction hereinafter fully described, particularly pointed out in the claims, and clearly illustrated by the accompanying drawings, in which—

Figure 1:
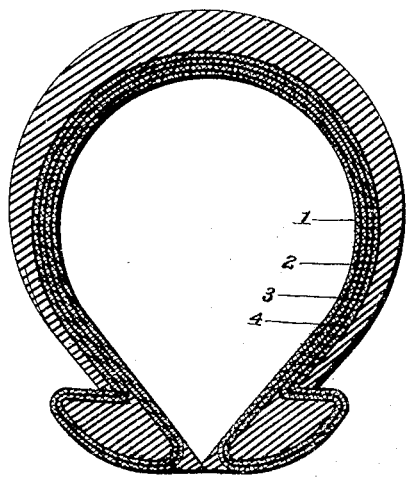
Figure 2:
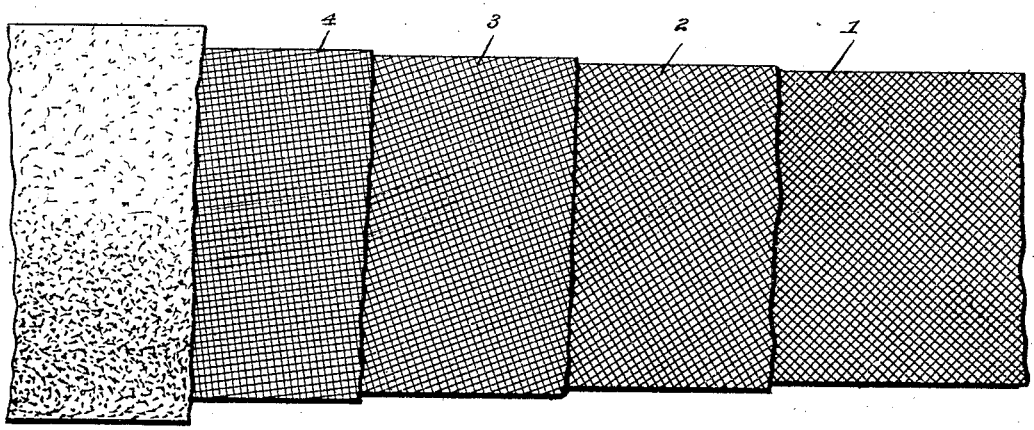

Figure 1 is a transverse sectional view of a tire-cover constructed in accordance with my invention, and Fig. 2 a plan view showing the successive layers of fabric of which the cover is composed.

The present invention is another means for carrying out the invention covered, broadly, in my application for Letters Patent, filed September 9, 1904, Serial No. 223,846, in which application I have disclosed and claimed, broadly, means for increasing the life of tires, or other tubular flexible articles designed to withstand internal pressure by rendering them less liable to burst. As set forth in said case, I have discovered by exhaustive experiments that in the tires in general use the pressure acts upon each layer of fabric or other material separately instead of upon the several layers as a whole and that the fabric of said layers being of the same elasticity each layer, beginning with the first one, has an increased limit of elasticity over the one preceding it, due to the increasing areas of the layers, the arc of each succeeding layer being greater than its predecessor. To avoid this difficulty and provide a structure that will have a uniform stretching capacity, I have arranged layers of fabric or other material having varying degrees of elasticity and have so calculated this that all of the layers when in position will have the same limit of elasticity regardless of the difference in areas of the several layers. In the present invention I accomplish this by using fabrics 1, 2, 3, and 4, cut at different angles, the fabric 1 being cut at the angle to give the greatest degree of elasticity—say at an angle of forty-five degrees—each succeeding layer being cut at a proportionately greater angle, thereby lessening proportionately the elasticity of each succeeding layer until the last layer would be cut approximately straight, whereby under pressure each layer will stretch equally and the whole structure will stretch uniformly.

While I have shown and described four layers of fabrics, it will be understood that the number of layers or piles of fabric to a layer has nothing to do with the scope of my invention.

My invention is applicable to single-tube pneumatic tires and to hose and to any yielding or flexible tubular body designed to withstand internal pressure, and while in the present application I have shown and described my invention as applied to a tire-cover I do not so limit it, as it may be applied to other structures, as stated.

Having thus fully described my invention, what I claim as new, and desire to secure by Letters Patent of the United States, is—

1. A tire-cover comprising layers of fabric each layer being cut at a different angle, the innermost layer being cut approximately bias, and each succeeding layer at a greater angle than its predecessor, for the purpose set forth.

2. A tire-cover comprising layers of fabric cut at an angle to give different degrees of elasticity, the innermost layer being cut at an angle to give the greatest degree of elasticity, and each succeeding layer cut at an angle to give a smaller degree of elasticity than its predecessor, for the purpose set forth.

3. A pneumatic-tire cover of rubber and layers of fabric cut at different angles to give different degrees of elasticity, the innermost layer having the greatest degree of elasticity and each succeeding layer a smaller degree of elasticity than its predecessor, for the purpose set forth.

4. A tire element of rubber and layers of fabric or the like, each layer being cut at a different angle, the innermost layer being cut at an angle to give the greatest degree of elasticity and each succeeding layer a smaller degree of elasticity than its predecessor.

5. A yielding tubular body designed to withstand internal pressure, composed of rubber and layers of fabric or the like, each layer being cut at a different angle, the innermost layer being cut at an angle to give the greatest degree of elasticity and each succeeding layer a smaller degree of elasticity.

In testimony whereof I have signed my name to this specification in the presence of two subscribing witnesses.

ARTHUR H. MARKS.

Witnesses:
O. S. HART,
A. L. PARDEE.